United States Patent
Ghavami et al.

(10) Patent No.: US 9,332,547 B1
(45) Date of Patent: May 3, 2016

(54) FREQUENCY BAND SELECTION FOR WIRELESS DEVICE COMMUNICATION

(71) Applicant: Sprint Spectrum LP, Overland Park, KS (US)

(72) Inventors: Gila Ghavami, Reston, VA (US); Muhammad Naim, Sterling, VA (US); Daniel Vivanco, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 105 days.

(21) Appl. No.: 14/201,693

(22) Filed: Mar. 7, 2014

(51) Int. Cl.
*H04W 72/04* (2009.01)

(52) U.S. Cl.
CPC .................. *H04W 72/0453* (2013.01)

(58) Field of Classification Search
CPC .................................. H04W 72/0453
See application file for complete search history.

(56) References Cited

U.S. PATENT DOCUMENTS

| | | | | |
|---|---|---|---|---|
| 5,813,993 A * | 9/1998 | Kaplan et al. | .................. | 600/544 |
| 5,987,305 A * | 11/1999 | Reitberger | ...................... | 455/62 |
| 6,785,291 B1 | 8/2004 | Cao et al. | | |
| 8,547,884 B2 * | 10/2013 | Lo et al. | ......................... | 370/295 |
| 2006/0014510 A1 * | 1/2006 | Yamamoto et al. | ............ | 455/260 |
| 2009/0257387 A1 | 10/2009 | Gholmich et al. | | |
| 2010/0316004 A1 * | 12/2010 | Macias et al. | ................. | 370/329 |
| 2015/0057041 A1 * | 2/2015 | Bao et al. | ....................... | 455/515 |

* cited by examiner

*Primary Examiner* — Brian D Nguyen (57) ABSTRACT

In systems and methods of frequency band selection for wireless device communication, a first frequency band comprising a first channel bandwidth is associated with a first application type and a second frequency band comprising a second channel bandwidth is associated with a second application type. When a request to establish a communication session is received at an access node from a wireless device, an application type associated with the request, a frequency band for the communication session with the wireless device based on the application type from among the first frequency band and the second frequency band, and the communication session is established between the access node and the wireless device using the selected frequency band.

20 Claims, 6 Drawing Sheets

FREQUENCY BAND SELECTION FOR WIRELESS DEVICE COMMUNICATION

TECHNICAL BACKGROUND

Wireless communication network providers strive to provide high quality services using finite wireless communication resources. As the communication demands of wireless devices on communication networks increase, various data traffic management solutions have been applied to meet these demands. Typical traffic management methods are applied reactively, for example, when the demand for communication resources from wireless devices approaches or exceeds the available resources. Reactive solutions by definition are unable to anticipate or prepare for conditions of high demand. Additionally, reactive solutions themselves consume network resources due to the signaling among network elements required to detect and respond to high demand network conditions.

OVERVIEW

In operation, a first frequency band comprising a first channel bandwidth is associated with a first application type, and a second frequency band comprising a second channel bandwidth is associated with a second application type. A request to establish a communication session is received at an access node from a wireless device, and an application type associated with the request is determined. A frequency band is selected for the communication session with the wireless device based on the application type from among the first frequency band and the second frequency band, and the communication session is established between access node and the wireless device using the selected frequency band. In embodiments, the frequency band can be selected further based on a first bandwidth usage of the first application type and a second bandwidth usage of the second application type, a first data traffic pattern of the first application type and a second data traffic pattern of the second application type, a first traffic class indicator associated with the first application type and a second traffic class indicator associated with the second application type, and/or a time of day when the request is received to establish the communication session.

DETAILED DESCRIPTION

Figure 1:
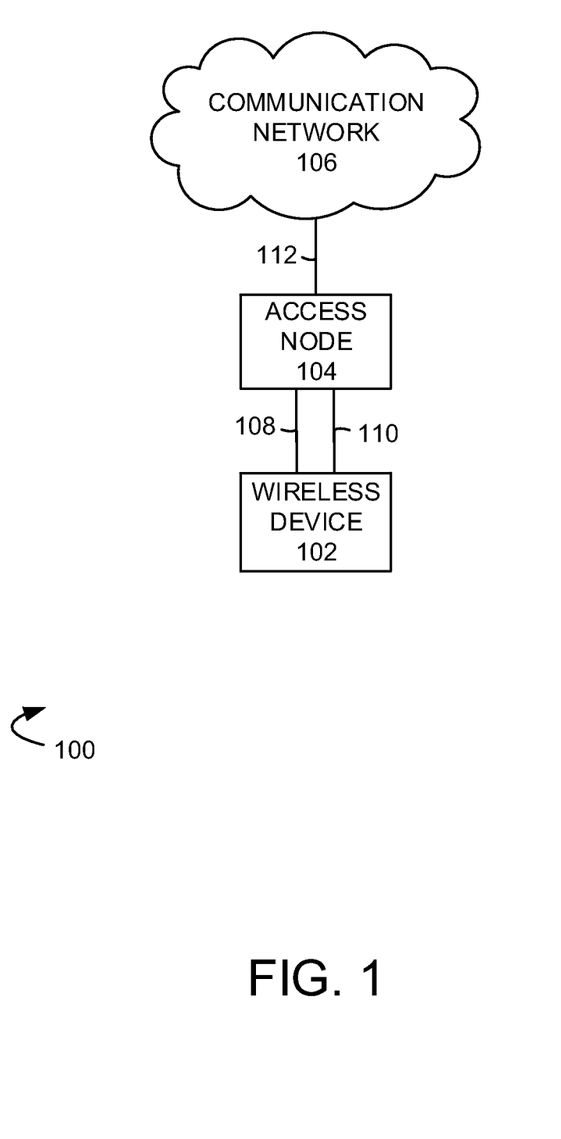
FIG. 1 illustrates an exemplary communication system for frequency band selection for wireless device communication.

FIG. 1 illustrates an exemplary communication system 100 for frequency band selection for wireless device communication comprising wireless device 102, access node 104, and communication network 106. Examples of wireless device 102 can comprise a cell phone, a smart phone, a computing platform such as a laptop, palmtop, or tablet, a personal digital assistant, or an internet access device, including combinations thereof. Wireless device 102 can communicate with access node 104 over communication links 108 and 110. Communications link 108 can comprise a first frequency band, and communication link 110 can comprise a second frequency band.

Access node 104 is a network node capable of providing wireless communications to wireless device 102, and can be, for example, a base transceiver station, a radio base station, an eNodeB device, or an enhanced eNodeB device. Access node 104 is in communication with communication network 106 over communication link 112.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 can be capable of carrying voice information and other data, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 106 may also comprise a wireless network, including base stations, wireless communication nodes, telephony switches, internet routers, network gateways, computer systems, communication links, or some other type of communication equipment, and combinations thereof.

Communication links 108, 110, and 112 can comprise wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104 and communication network 106 which are omitted for clarity, including additional processing nodes, routers, gateways, and physical and/or wireless data links for carrying data among the various network elements.

Typical traffic management methods are reactive, and are applied in response to detected network conditions, such as when a demand for communication resources from wireless devices approaches or exceeds available resources. Being reactive, such methods are unable to anticipate for conditions of high demand. Additionally, reactive solutions themselves consume network resources due to the signaling among network elements required to detect and respond to high demand network conditions. Accordingly, it is desirable to anticipate conditions of high demand and/or high resource utilization rather than using reactive approaches to traffic management. Anticipating conditions of high demand and/or high communication resource utilization can reduce network resource utilization and increase efficiency of network traffic management.

In operation, a first frequency band (such as communication link 108) comprising a first channel bandwidth is associated with a first application type, and a second frequency band (such as communication link 110) comprising a second channel bandwidth is associated with a second application type. When a request to establish a communication session is received at an access node from wireless device 102, an application type associated with the request is determined. A frequency band is selected for the communication session between access node 104 and wireless device 102 based on the application type from among the first frequency band and the second frequency band, and the communication session is established between access node 104 and wireless device 102 using the selected frequency band.

Figure 2:
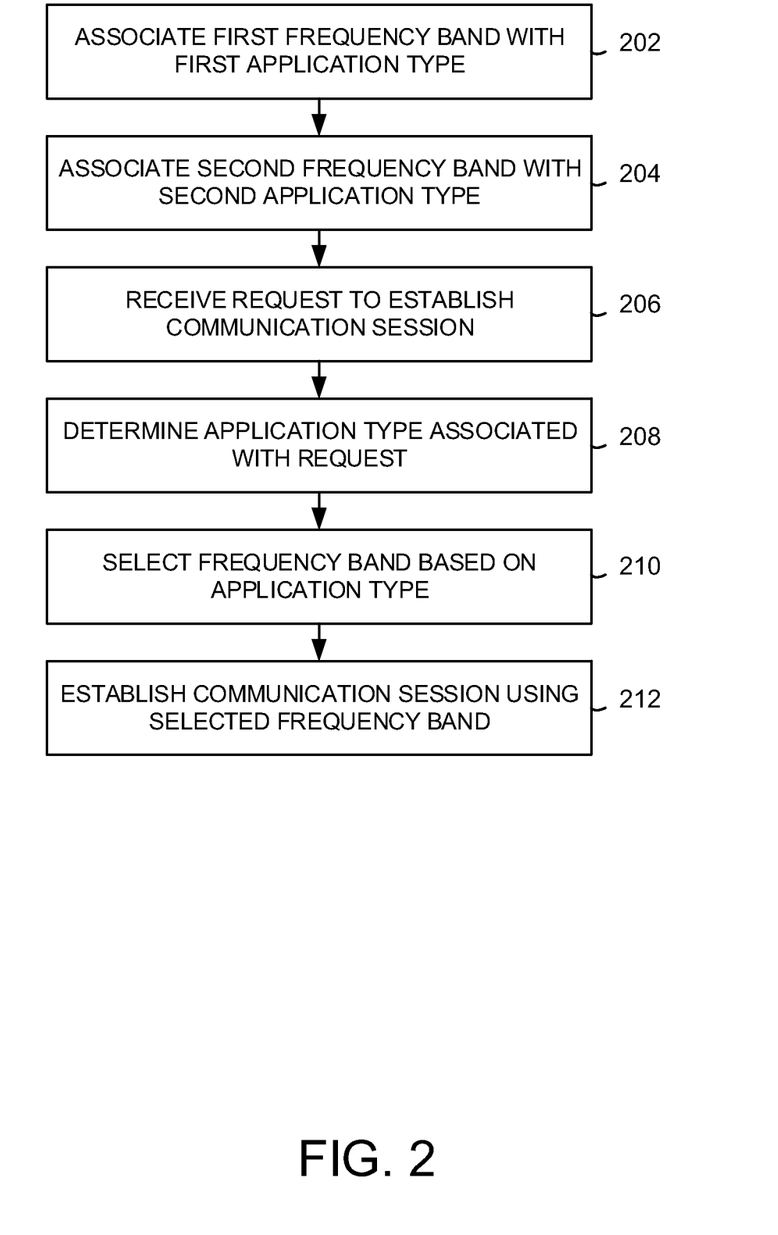
FIG. 2 illustrates an exemplary method of frequency band selection for wireless device communication.

FIG. 2 illustrates an exemplary method of frequency band selection for wireless device communication. A first frequency band comprising a first channel bandwidth is associated with a first application type (operation 202), and a second frequency band comprising a second channel bandwidth is associated with a second application type (operation 204). A wireless communication network can comprise a plurality of frequency bands, for example, 800 MHz, 1.9 GHz, 2.5 GHz, and the like. For example, communication link 108 and communication link 110 can each comprise one of an 800 MHz frequency band, a 1.9 GHz frequency band, a 2.5 GHz frequency band, and the like. In operation, each communication link comprises a different frequency band. Frequency bands can comprise one or more channels, which comprise a subset of the range of frequencies in a frequency band. The subset of the range of frequencies in a frequency band can be referred to as a bandwidth or a channel bandwidth. For example, the 2.5 GHz frequency band can comprise one or more channels of 20 MHz channel bandwidth, and the 1.9 GHz frequency band can comprise one or more channels of 5 MHz channel bandwidth. Generally, a channel with a greater bandwidth can provide a higher data rate or a higher throughput than a channel with a smaller bandwidth.

An application type can be characterized according to an application requirement, such as a minimum data rate, a maximum permitted data delay, a minimum throughput, a maximum error rate, a maximum data loss rate, and the like, of an application running on a wireless device, required for the application to provide a threshold level of performance. The application type can also comprise, for example, whether the application is a relatively delay sensitive application (such as a streaming audio application a streaming video application, a voice application, and the like) or a relatively delay insensitive application (such as an email application, a messaging application, a web browsing application, and the like). The application type can also be evaluated based on the application's utilization or requested utilization of communication link resources, for example, an amount of data sent to or from a wireless device, a number of physical resource blocks or other wireless communication link resource utilized by the wireless device, a requested amount of data to be sent to or from the wireless device (as may be determined from a buffer status report or similar request for wireless communication link resources), an amount of data buffered for transmission to or from the wireless device, and the like, including combinations thereof.

A request to establish a communication session is received at an access node from a wireless device (operation 206), and an application type associated with the request is determined (operation 208). For example, a request to establish a communication session can be received at access node 104 from wireless device 102. The request can be received at access node 104 from wireless device 102 to establish a voice communication session for a voice application running on wireless device 102, or to establish a data communication session for a messaging application running on wireless device 102, and so forth.

Based on the determined application type, a frequency band is selected for the communication session with the wireless device from among the first frequency band and the second frequency band (operation 210). For example, it can be determined that the request to establish the communication comprises a delay sensitive application type, such as for a voice application. In such case, a frequency band comprising channels of relatively greater bandwidth can be selected for the communication session with the delay sensitive application. As another example, it can be determined that the request to establish the communication comprises a delay insensitive application type, such as for an email application. In such case, a frequency band comprising channels of relatively smaller bandwidth can be selected for the communication session with the delay insensitive application. When the frequency band is selected, the communication session is established between access node and the wireless device using the selected frequency band (operation 210).

Figure 3:
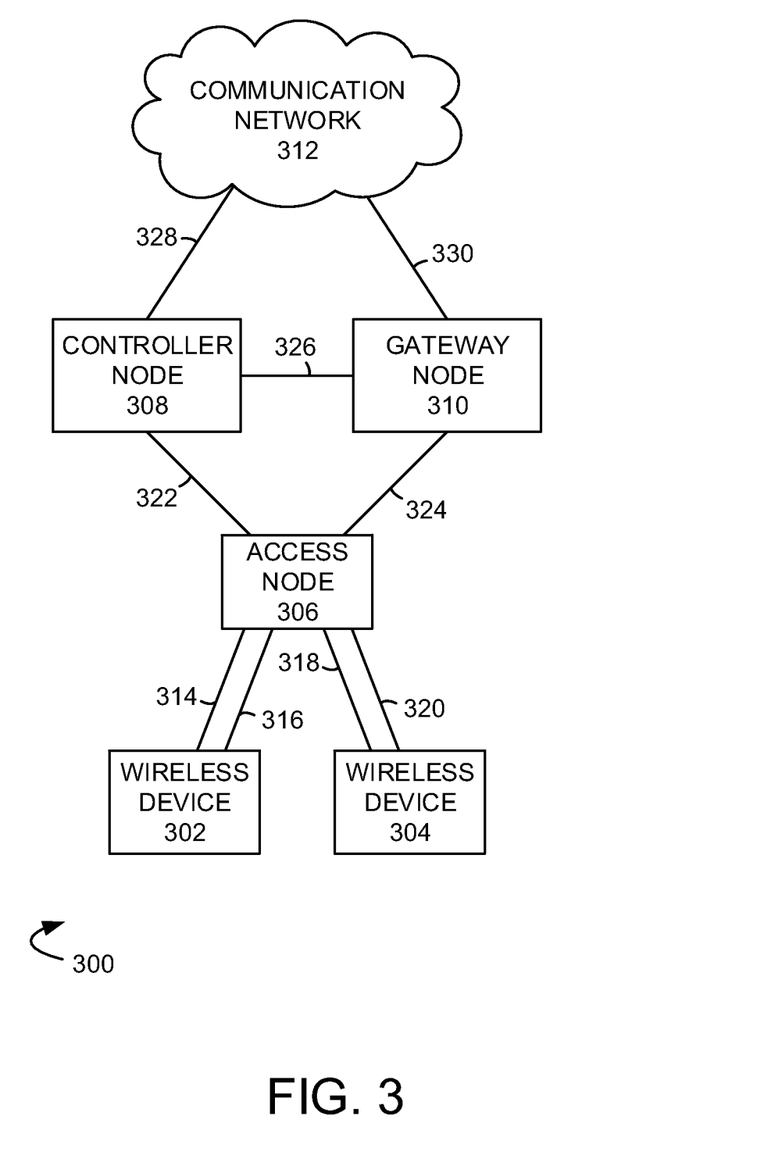
FIG. 3 illustrates another exemplary communication system for frequency band selection for wireless device communication.

FIG. 3 illustrates another exemplary communication system 300 for frequency band selection for wireless device communication comprising wireless devices 302 and 304, access node 306, controller node 308, gateway node 310, and communication network 312. Examples of wireless devices 302 and 304 can comprise a cell phone, a smart phone, a computing platform such as a laptop, palmtop, or tablet, a personal digital assistant, or an internet access device, including combinations thereof. Wireless device 302 can communicate with access node 306 over communication links 314 and 316. Wireless device 304 can communicate with access node 306 over communication links 318 and 320. Communications links 314 and 318 can comprise a first frequency band, and communication links 316 and 320 can comprise a second frequency band.

Access node 306 is a network node capable of providing wireless communications to wireless devices 302 and 304, and can be, for example, a base transceiver station, a radio base station, an eNodeB device, or an enhanced eNodeB device. Access node 306 is in communication with controller node 308 over communication link 322 and with gateway node 310 over communication link 324.

Controller node 308 can comprise a processor and associated circuitry to execute or direct the execution of computer-readable instructions, and can be configured to control the setup and maintenance of a communication session over communication network 312 for wireless device 302, as well as to maintain network connection information associated with wireless devices 302 and 304. Controller node 308 can comprise a mobile switching center (MSC), a dispatch call controller (DCC), a mobility management entity (MME), or another similar network node. Controller node 308 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 308 can receive instructions and other input at a user interface. Controller node 308 is in communication with communication network 312 over communication link 328.

Gateway node 310 can comprise a processor and associated circuitry to execute or direct the execution of computer-readable instructions. Gateway node 310 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 310 can receive instructions and other input at a user interface. Examples of gateway node 310 can include a standalone computing device, a computer system, or a network component, such as an access service network gateway (ASN-GW), a packet data network gateway (P-GW), a serving gateway (S-GW), a mobile switching controller (MSC), a packet data serving node (PDSN), call processing equipment, a home agent, a radio node controller (RNC), a subscriber profile system (SPS), authentication, authorization, and accounting (AAA) equipment, and a network gateway, including combinations thereof. Gateway node 310 is in communication with controller node 308 over communication link 326 and with communication network 312 over communication link 330.

Communication network 312 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 312 can be capable of carrying voice information and other data, for example, to support communications by a wireless device such as wireless devices 302 and 304. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 312 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 312 may also comprise a wireless network, including base stations, wireless communication nodes, telephony switches, internet routers, network gateways, computer systems, communication links, or some other type of communication equipment, and combinations thereof.

Communication links 314, 316, 318, 320, 322, 324, 326, 328, and 330 can comprise wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 306, controller node 308, gateway node 310, and communication network 312 which are omitted for clarity, including additional processing nodes, routers, gateways, and physical and/or wireless data links for carrying data among the various network elements.

Figure 4:
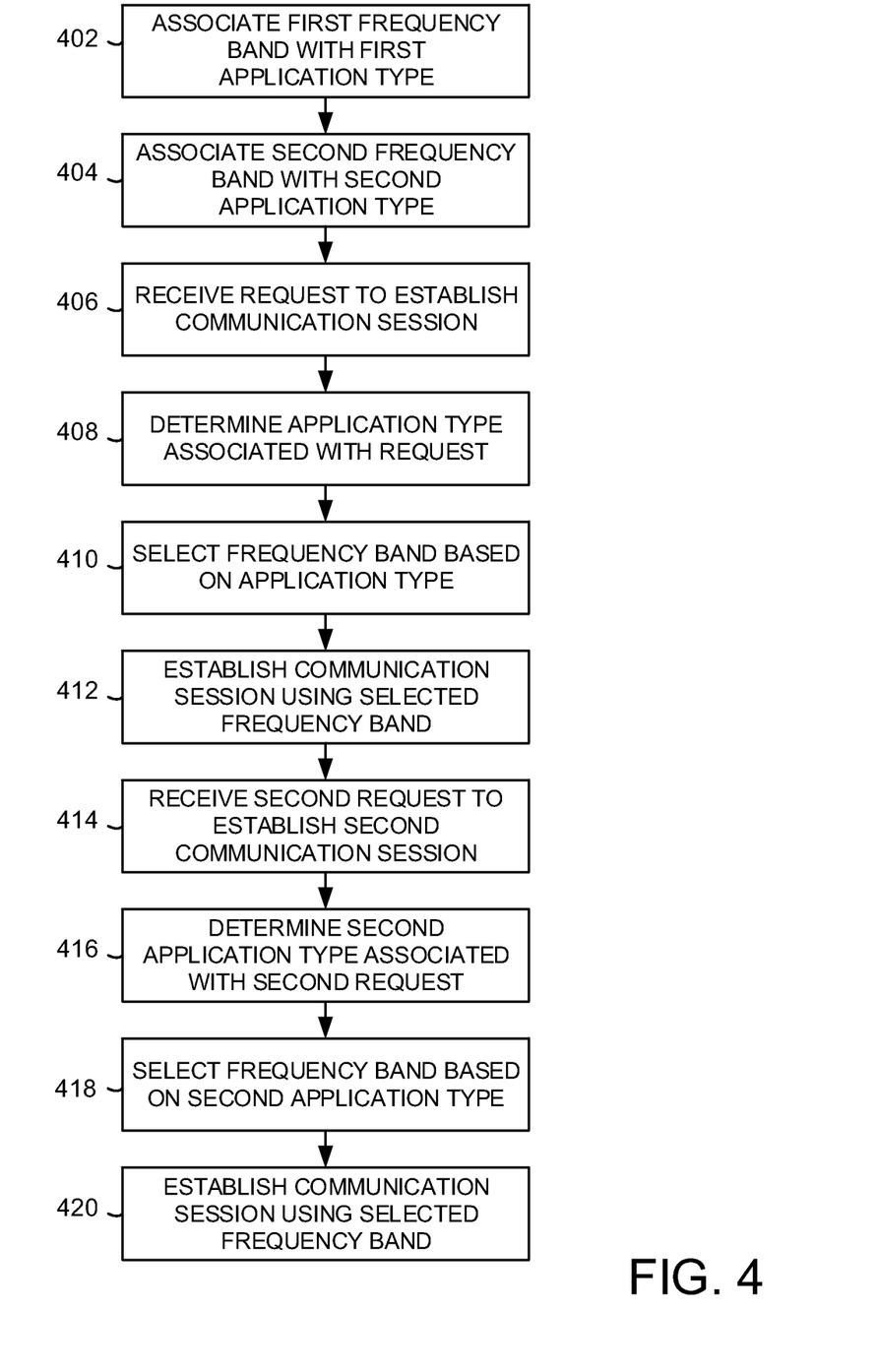
FIG. 4 illustrates another exemplary method of frequency band selection for wireless device communication.

FIG. 4 illustrates another exemplary method of frequency band selection for wireless device communication. A first frequency band comprising a first channel bandwidth is associated with a first application type (operation 402), and a second frequency band comprising a second channel bandwidth is associated with a second application type (operation 404). A wireless communication network can comprise a plurality of frequency bands, for example, 800 MHz, 1.9 GHz, 2.5 GHz, and the like. For example, communication links 314, 316, 318, and 320 can each comprise one of an 800 MHz frequency band, a 1.9 GHz frequency band, a 2.5 GHz frequency band, and the like. In an embodiment, communication links 314 and 316 comprise different frequency bands, and communication links 318 and 320 comprise different frequency bands. Frequency bands can comprise one or more channels, which comprise a subset of the range of frequencies in a frequency band. The subset of the range of frequencies in a frequency band can be referred to as a bandwidth or a channel bandwidth. For example, the 2.5 GHz frequency band can comprise one or more channels of 20 MHz channel bandwidth, and the 1.9 GHz frequency band can comprise one or more channels of 5 MHz channel bandwidth. Generally, a channel with a greater bandwidth can provide a higher data rate or a higher throughput than a channel with a smaller bandwidth.

An application type can be characterized according to an application requirement, such as a minimum data rate, a maximum permitted data delay, a minimum throughput, a maximum error rate, a maximum data loss rate, and the like, of an application running on a wireless device, required for the application to provide a threshold level of performance. The application type can also comprise, for example, whether the application is a relatively delay sensitive application (such as a streaming audio application a streaming video application, a voice application, and the like) or a relatively delay insensitive application (such as an email application, a messaging application, a web browsing application, and the like). The application type can also be evaluated based on the application's utilization or requested utilization of communication link resources, for example, an amount of data sent to or from a wireless device, a number of physical resource blocks or other wireless communication link resource utilized by the wireless device, a requested amount of data to be sent to or from the wireless device (as may be determined from a buffer status report or similar request for wireless communication link resources), an amount of data buffered for transmission to or from the wireless device, and the like, including combinations thereof.

The associations of the frequency bands to application types can further be based on a first bandwidth usage of the first application type and a second bandwidth usage of the second application type. For example, an application type can be characterized based on a quantity of bandwidth per unit time which the application type requires to provide a threshold level of application performance. To determine a bandwidth usage of an application type, the bandwidth usage of several applications can be compared to each other, for example, based on a sample of applications typically used by wireless devices in the communication network. Bandwidth usage of applications can also be characterized relative to one or more bandwidth usage thresholds. The bandwidth usage of an application can thus be characterized as low, moderate, high, and the like. The bandwidth usage of an application can also be characterized numerically, for example, as an amount of bandwidth per unit time used by an application. The bandwidth usage can further be based on historical bandwidth usage by applications running on wireless devices in the communication network. Application types associated with greater bandwidth usage can be associated with larger bandwidth frequency bands, and application types with smaller bandwidth usage can be associated with smaller bandwidth frequency bands.

The associations of the frequency bands to application types can further be based on a first data traffic pattern of the first application type and a second data traffic pattern of the second application type. For example, an application type can be characterized based on a length of data streams sent to or from the application, a rate of change of the length of data streams sent to or from the application, a frequency with which short data streams are sent to or from the application, and the like. The application type can thus be characterized according to jitter, burstiness, length of data streams, amount of time that data streams are at a steady state, and the like. The determination of data traffic patterns of applications can be a relative determination based on a comparison several application data traffic patterns. The determination of data traffic patterns can also be determined relative to one or more data traffic pattern thresholds. Application types associated with smaller jitter or burstiness, or with longer data streams, can be associated with larger bandwidth frequency bands, and application types associated with greater jitter or burstiness, or with shorter data streams, can be associated with smaller bandwidth frequency bands.

The associations of the frequency bands to application types can further be based on a first traffic class indicator associated with the first application type and a second traffic class indicator associated with the second application type. A traffic class indicator can comprise an indication of a routing priority applied to data packets associated with the application, such as, for example, a quality of service class indicator (QCI) and the like. Application types associated with higher traffic class indicators can be associated with larger bandwidth frequency bands, and application types with lower traffic class indicators can be associated with smaller bandwidth frequency bands.

The associations of the frequency bands to application types can also be based on a time of day. For example, based on historical data, it can be determined that at a first time, a particular application is commonly or prevalently used, based on application type, bandwidth usage, data traffic pattern, and/or traffic class indicator associated with applications. Thus, based on a time of day, a first application type can be associated with a first frequency band, and a second application type can be associated with a second frequency band.

It will be appreciated that the associations of application types to frequency bands can be made for an individual access node, or for individual sectors or cells of an access node.

Subsequent to the association of frequency bands and application types, a request to establish a communication session is received at an access node from a wireless device (operation 406), and an application type associated with the request is determined (operation 408). For example, a request to establish a communication session can be received at access node 306 from wireless device 302. The request can be received at access node 306 from wireless device 302 to establish a voice communication session for a voice application running on wireless device 302, or to establish a data communication session for a messaging application running on wireless device 302, and so forth.

Based on the determined application type, a frequency band is selected for the communication session with the wireless device from among the first frequency band and the second frequency band (operation 410). For example, it can be determined that the request to establish the communication comprises a delay sensitive application type, such as for a voice application. In such case, a frequency band comprising channels of relatively greater bandwidth can be selected for the communication session with the delay sensitive application. As another example, it can be determined that the request to establish the communication comprises a delay insensitive application type, such as for an email application. In such case, a frequency band comprising channels of relatively smaller bandwidth can be selected for the communication session with the delay insensitive application.

The frequency band can also be selected for the communication session with the wireless based on a first coverage area of the first frequency band, a second coverage area of the second frequency band, and a location of the wireless device. Different frequency bands may comprise different coverage areas, can be detected at a threshold signal level at different radii from an access node, and the like. For example, an 800 MHz frequency band may comprise a greater coverage area than a 1.9 GHz frequency band, and a 1.9 GHz frequency band may comprise a greater coverage area than a 2.5 GHz frequency band. When a wireless device is located near an outer edge of a first frequency band, a second frequency band comprising a larger coverage area can be selected for the wireless device, to avoid triggering an inter-frequency handover, a loss or termination of a communication session, and the like. When the wireless device is not located near a coverage area edge, the first frequency band (comprising the relatively smaller coverage area) can be selected. The application type may also be considered. For example, when the wireless device is running a delay sensitive application (e.g., a voice application), and the wireless device is located near an outer edge of a first frequency band, a second frequency band comprising a larger coverage area can be selected for the wireless device. When the wireless device is running a delay insensitive application, and the wireless device is not located near a coverage area edge, the first frequency band (comprising the relatively smaller coverage area) can be selected.

The frequency band can also be selected for the communication session with the wireless based on a service class associated with the wireless device. For example, the wireless device can be associated with a level of priority provisioned within the communication system for the wireless device, such as a premium-level subscriber, an emergency responder, and the like. When the service class associated with the wireless device is relatively higher, a frequency band comprising a larger channel bandwidth can be selected. When the service class associated with the wireless device is relatively lower, a frequency band comprising a smaller channel bandwidth can be selected.

The frequency band can also be selected for the communication session with the wireless based on a first resource utilization of the first frequency band and a second resource utilization of the second frequency band. A resource utilization of a frequency band can comprise a utilization of resources of the first and second frequency bands by other wireless devices determined at or before the time that the request to establish the communication session is received from the wireless device. A resource utilization of a frequency band can comprise a utilization or requested utilization of communication link resources, for example, an amount of data sent to or from the wireless device, a number of physical resource blocks or other wireless communication link resource utilized by the wireless device, a requested amount of data to be sent to or from the wireless device (as may be determined from a buffer status report or similar request for wireless communication link resources), an amount of data buffered for transmission to or from the wireless device, a number of wireless devices currently using the first and second frequency bands, and the like, including combinations thereof. A frequency band can be selected for the wireless device to direct the wireless device to a frequency band comprising relatively less resource utilization.

In an embodiment, the frequency band can be selected so that a first resource utilization of a first frequency band remains below a first resource utilization threshold, and a second resource utilization of a second frequency band remains below a second resource utilization threshold. That is, the frequency band can be selected to balance the resource utilization of the first and second frequency bands. In an embodiment, the frequency band can be selected to balance resource utilization on a per sector basis as well, so that a first resource utilization of a first frequency band in a first sector of an access node remains below a first resource utilization threshold, and a second resource utilization of a second frequency band of the access node remains below a second resource utilization threshold.

The frequency band can also be selected for the communication session with the wireless based on a time of day. For example, based on historical data, it can be determined that at a first time a particular application is commonly or prevalently used on a first frequency band and/or a second frequency band, based on application type, bandwidth usage, data traffic pattern, and/or traffic class indicator associated with applications. Further, based on historical data, it can be determined that a first frequency band and/or a second frequency band experiences resource utilization at or above a resource utilization threshold. Thus, based on a time of day, a frequency band can be selected for the wireless device.

When the frequency band is selected, the communication session is established between access node and the wireless device using the selected frequency band (operation 412).

In operation 414, a second request to establish a second communication session is received at an access node from a wireless device. An application type associated with the second request is then determined (operation 416). For example, a second request to establish a second communication session for a different application than the first communication session can be received at access node 306 from wireless device 302.

Based on the determined application type, a frequency band is selected for the communication session with the wireless device from among the first frequency band and the second frequency band (operation 418). The application type associated with the second communication session request can comprise a different application type than the application used for the first communication session. The second application type can comprise a different level of delay sensitivity, different required data rate, different permitted data delay, and so forth. For example, it can be determined that the request to establish the communication comprises a delay sensitive application type, such as for a voice application. In such case, a frequency band comprising channels of relatively greater bandwidth can be selected for the communication session with the delay sensitive application. As another example, it can be determined that the request to establish the communication comprises a delay insensitive application type, such as for an email application. In such case, a frequency band comprising channels of relatively smaller bandwidth can be selected for the communication session with the delay insensitive application. When the second frequency band is selected based on the second application type, the second communication session is established between access node and the wireless device using the selected second frequency band (operation 420).

Figure 5:
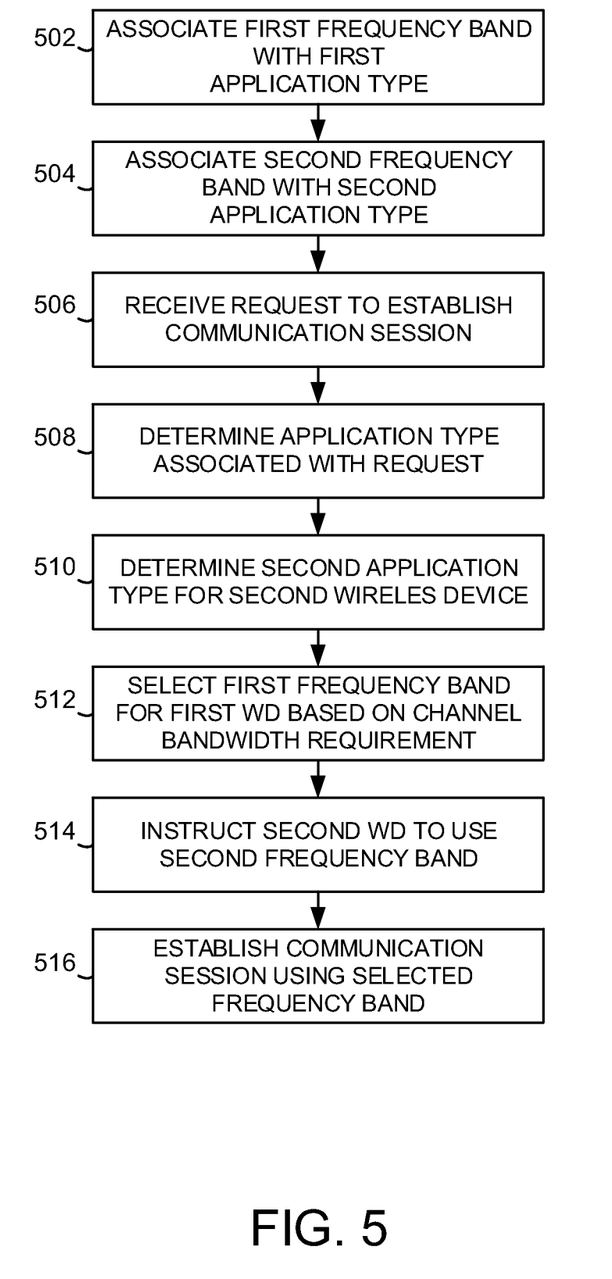
FIG. 5 illustrates another exemplary method of frequency band selection for wireless device communication.

FIG. 5 illustrates another exemplary method of frequency band selection for wireless device communication. A first frequency band comprising a first channel bandwidth is associated with a first application type (operation 502), and a second frequency band comprising a second channel bandwidth is associated with a second application type (operation 504). For example, communication links 314, 316, 318, and 320 can each comprise one of an 800 MHz frequency band, a 1.9 GHz frequency band, a 2.5 GHz frequency band, and the like, and each frequency band can comprise one or more channels, which comprise a subset of the range of frequencies in a frequency band. Generally, a channel with a greater bandwidth can provide a higher data rate or a higher throughput than a channel with a smaller bandwidth. An application type can be characterized according to an application requirement, whether the application is a relatively delay sensitive or delay insensitive application, based on the application's utilization or requested utilization of communication link resources, and the like, including combinations thereof. The associations of the frequency bands to application types can further be based on a first bandwidth usage of the first application type and a second bandwidth usage of the second application type. The associations of the frequency bands to application types can further be based on a first data traffic pattern of the first application type and a second data traffic pattern of the second application type, traffic class indicators associated with application types, and time of day. Associations of application types to frequency bands can be made for an individual access node, or for individual sectors or cells of an access node.

Subsequent to the association of frequency bands and application types, a request to establish a communication session is received at an access node from a first wireless device (operation 506), and a first application type associated with the request is determined (operation 508). For example, a request to establish a communication session can be received at access node 306 from wireless device 302. The request can be received at access node 306 from wireless device 302 to establish a voice communication session for a voice application running on wireless device 302, or to establish a data communication session for a messaging application running on wireless device 302, and so forth.

When the request to establish the communication session is received from the first wireless device, a second application type of a second application running on a second wireless device which is in communication with the access node using the first frequency band is determined (operation 510). The second application type of the second wireless device can be determined in similar ways as described above.

Based on the first application type, the first frequency band is selected for the wireless device (operation 512). For example, it can be determined that the request to establish the communication comprises a delay sensitive application type, such as for a voice application. In such case, a frequency band comprising channels of relatively greater bandwidth can be selected for the communication session with the delay sensitive application. As another example, it can be determined that the request to establish the communication comprises a delay insensitive application type, such as for an email application. In such case, a frequency band comprising channels of relatively smaller bandwidth can be selected for the communication session with the delay insensitive application.

Additional factors can be considered in the selection of a frequency band for the communication session with the first wireless device, such as a first coverage area of the first frequency band, a second coverage area of the second frequency band, and a location of the wireless device; a service class associated with the wireless device; and a first resource utilization of the first frequency band and a second resource utilization of the second frequency band. In an embodiment, the frequency band can be selected so that a first resource utilization of a first frequency band remains below a first resource utilization threshold, and a second resource utilization of a second frequency band remains below a second resource utilization threshold. The frequency band can further be selected for the communication session with the wireless based on a time of day. In an embodiment, the first frequency band can be selected for the first wireless device based on the first application type (of the first wireless device) and the second application type (of the second wireless device).

Next, the second wireless device can be instructed to change from communicating with the access node over one frequency band to communicating with the access node using a second frequency band (operation 514). For example, when the first frequency band is selected for the first wireless device (e.g., wireless device 302), the second wireless device (e.g., wireless device 304) can be instructed to change from using the first frequency band to using the second frequency band. For example, when the second frequency band comprises a second channel bandwidth smaller than the first channel bandwidth, and when the application type of the wireless device is greater than the second application type of the second wireless device, a handover can be performed of the second wireless device from the first frequency band to the second frequency band.

A location of each of the first and second wireless devices can be considered as well. For example, when the first wireless device is closer to an edge of a largest coverage area of the access node than the second wireless device, the second wireless device can be instructed to change to using a frequency band comprising a smaller coverage area than the frequency band selected for the wireless device, based on the application type running on the first wireless device. In an embodiment, the frequency band can be selected for the first wireless device and/or the second wireless device so that a first resource utilization of a first frequency band remains below a first resource utilization threshold, and a second resource utilization of a second frequency band remains below a second resource utilization threshold. That is, the frequency bands can be selected to balance the resource utilization of the first and second frequency bands. In an embodiment, the frequency band can be selected to balance resource utilization on a per sector basis as well, so that a first resource utilization of a first frequency band in a first sector of an access node remains below a first resource utilization threshold, and a second resource utilization of a second frequency band of the access node remains below a second resource utilization threshold. When the second wireless device is instructed to use the second frequency band, the communication session is established between access node and the first wireless device using the selected first frequency band (operation 516).

Figure 6:
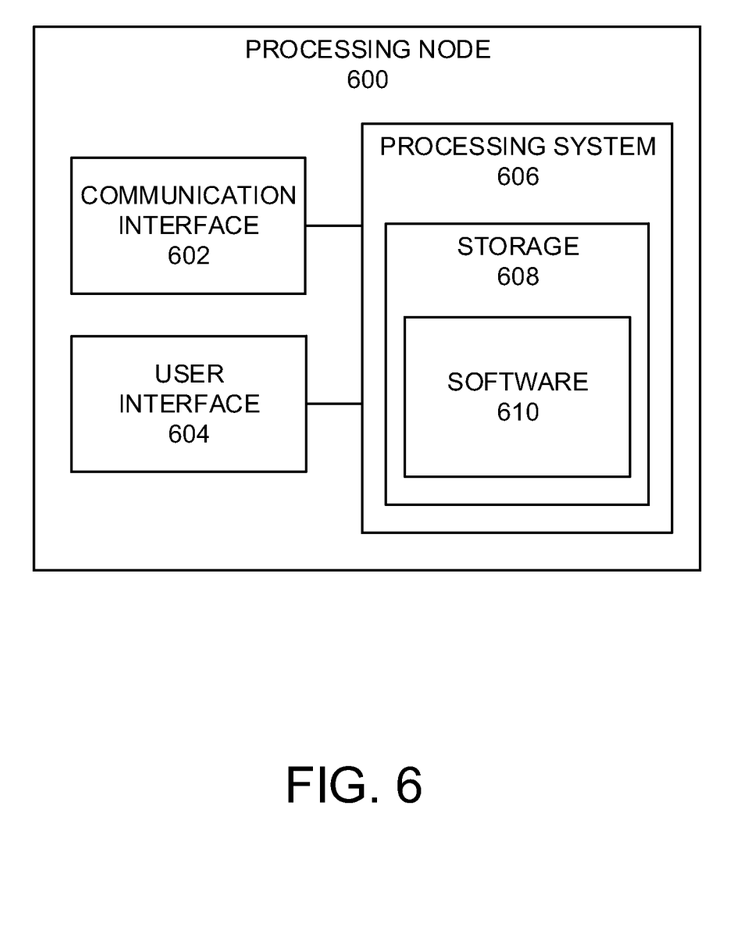
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 can be configured to select a frequency band for wireless device communication. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include access node 104, access node 306, controller node 308, and gateway node 310. Processing node 600 can also be an adjunct or component of a network element, such as an element of access node 104, access node 306, controller node 308, and gateway node 310. Processing node 600 can also be another network element in a communication system. Further, the functionality of processing node 600 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method of frequency band selection for wireless device communication, comprising:
    associating a first frequency band comprising a first channel bandwidth with a first application type and a second frequency band comprising a second channel bandwidth with a second application type, wherein both the first and second application types are characterized based on a length of data streams and a rate of change of the length of data streams sent to or from each of the first and second application types respectively;
    receiving at an access node from a first wireless device a request to establish a communication session using one of the first or second application types;
    determining an application type associated with the request from among the first application type and the second application type;
    selecting a frequency band for the communication session with the first wireless device based on the application type from among the first frequency band and the second frequency band; and
    establishing the communication session between the access node and the first wireless device using the selected frequency band.

2. The method of claim 1, further comprising associating the first frequency band with the first application type and the second frequency band with the second application type based on a first bandwidth usage of the first application type and a second bandwidth usage of the second application type.

3. The method of claim 1, further comprising associating the first frequency band with the first application type and the second frequency band with the second application type based on a first data traffic pattern of the first application type and a second data traffic pattern of the second application type.

4. The method of claim 1, further comprising associating the first frequency band with the first application type and the second frequency band with the second application type based on a first traffic class indicator associated with the first application type and a second traffic class indicator associated with the second application type.

5. The method of claim 1, further comprising associating the first frequency band with the first application type and the second frequency band with the second application type based on a time of day.

6. The method of claim 1, further comprising:
    selecting the frequency band for the communication session with the first wireless device from among the first frequency band and the second frequency band based on the application type, a first coverage area of the first frequency band, a second coverage area of the second frequency band, and a location of the first wireless device.

7. The method of claim 1, further comprising:
    selecting the frequency band for the communication session with the first wireless device from among the first frequency band and the second frequency band based on the application type and a service class associated with the first wireless device.

8. The method of claim 1, further comprising:
    selecting the frequency band for the communication session with the first wireless device based on the application type, a first resource utilization of the first frequency band, and a second resource utilization of the second frequency band.

9. The method of claim 8, wherein the frequency band is selected so that the first resource utilization remains below a first resource utilization threshold and the second resource utilization remains below a second resource utilization threshold.

10. The method of claim 1, further comprising:
    selecting the frequency band for the communication session with the first wireless device based on the application type and a time of day at which the request to establish the communication session is received.

11. The method of claim 1, further comprising:
    receiving at the access node from the first wireless device a second request to establish a second communication session;
    determining that the second application type is associated with the second request; and
    selecting the second frequency band for the second communication session with the first wireless device based on the second application type from among the first frequency band and the second frequency band.

12. The method of claim 1, further comprising:
    determining for a second wireless device in communication with the access node using the first frequency band that a second application of the second application type is running on the second wireless device;
    selecting the first frequency band for the communication session with the first wireless device based on the application type;
    instructing the second wireless device to change from using the first frequency band to using the second frequency band, wherein the second frequency band comprises a second channel bandwidth smaller than the first channel bandwidth, when the application type of the first wireless device uses a greater bandwidth than the second application type of the second wireless device; and
    establishing the communication session between the access node and the first wireless device using the first frequency band.

13. A system for frequency band selection for wireless device communication, comprising:
    a processing node configured to
        associate a first frequency band comprising a first channel bandwidth with a first application type and a second frequency band comprising a second channel bandwidth with a second application type, wherein both the first and second application types are characterized based on a length of data streams and a rate of change of the length of data streams sent to or from each of the first and second application types respectively;
        receive at an access node from a first wireless device a request to establish a communication session using one of the first or second application types;
        determine an application type associated with the request from among the first application type and the second application type;

select a frequency band for the communication session with the first wireless device based on the application type from among the first frequency band and the second frequency band; and establish the communication session between the access node and the first wireless device using the selected frequency band.

14. The system of claim 13, wherein the processing node is further configured to associate the first frequency band with the first application type and the second frequency band with the second application type based on a first bandwidth usage of the first application type and a second bandwidth usage of the second application type.

15. The system of claim 13, wherein the processing node is further configured to associate the first frequency band with the first application type and the second frequency band with the second application type based on a first data traffic pattern of the first application type and a second data traffic pattern of the second application type.

16. The system of claim 13, wherein the processing node is further configured to associate the first frequency band with the first application type and the second frequency band with the second application type based on a first traffic class indicator associated with the first application type and a second traffic class indicator associated with the second application type.

17. The system of claim 13, wherein the processing node is further configured to select the frequency band for the communication session with the first wireless device from among the first frequency band and the second frequency band based on the application type, a first coverage area of the first frequency band, a second coverage area of the second frequency band, and a location of the first wireless device.

18. The system of claim 13, wherein the processing node is further configured to select the frequency band for the communication session with the first wireless device from among the first frequency band and the second frequency band based on the application type and a service class associated with the first wireless device.

19. The system of claim 13, wherein the processing node is further configured to select the frequency band for the communication session with the first wireless device based on the application type, a first resource utilization of the first frequency band, and a second resource utilization of the second frequency band.

20. The system of claim 13, wherein the processing node is further configured to:
determine for a second wireless device in communication with the access node using the first frequency band that a second application of the second application type is running on the second wireless device;
select the first frequency band for the communication session with the first wireless device based on the application type;
instruct the second wireless device to change from using the first frequency band to using the second frequency band, wherein the second frequency band comprises a second channel bandwidth smaller than the first channel bandwidth, when the application type of the wireless device uses a greater bandwidth than the second application type of the second wireless device; and
establish the communication session between the access node and the first wireless device using the first frequency band.

* * * * *